(12) United States Patent
Chandley

(10) Patent No.: US 7,178,047 B2
(45) Date of Patent: Feb. 13, 2007

(54) METHOD TO REDUCE OR ELIMINATE AUDIO INTERFERENCE FROM COMPUTER COMPONENTS

(75) Inventor: Adrian M. Chandley, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 873 days.

(21) Appl. No.: 10/355,758

(22) Filed: Jan. 31, 2003

(65) Prior Publication Data

US 2004/0153177 A1 Aug. 5, 2004

(51) Int. Cl.
*G06F 5/06* (2006.01)

(52) U.S. Cl. .................. 713/600; 700/94; 386/125

(58) Field of Classification Search ............ 713/600; 700/94; 386/126
See application file for complete search history.

(56) References Cited

U.S. PATENT DOCUMENTS

| | | | | |
|---|---|---|---|---|
| 5,937,433 | A * | 8/1999 | Lee et al. ............ | 711/158 |
| 6,148,215 | A * | 11/2000 | Doi et al. ............ | 455/552.1 |
| 6,453,343 | B1 * | 9/2002 | Housel et al. ......... | 709/213 |
| 6,687,072 | B2 * | 2/2004 | Okuyama et al. ...... | 360/55 |
| 6,753,667 | B2 * | 6/2004 | Sakamoto ............ | 318/433 |
| 2002/0089774 | A1 * | 7/2002 | Veltchev et al. ....... | 360/69 |
| 2003/0198307 | A1 * | 10/2003 | Neill et al. ........... | 375/346 |
| 2003/0235408 | A1 * | 12/2003 | Silvester et al. ....... | 386/126 |
| 2004/0059250 | A1 * | 3/2004 | Causevic et al. ....... | 600/559 |

OTHER PUBLICATIONS

Osman S. Unsal, Raksit Ashok, Israel Koren, C. Mani Krishna, C Saba Andras Moritz; "Cool-Cache for Hot Multimedia" Department of Electrical and Computer Engineering, University of Massachusetts. 2001. 10 pgs.

Emmet Witchel, Sam Larsen, C. Scott Ananian and Krste Asanovic, "Direct Addressed Caches for Reduced Power Consumption", MIT Laboratory for Computer Science, Cambridge, MA, 2001, 10pgs.

* cited by examiner

*Primary Examiner*—Thomas Lee
*Assistant Examiner*—Vincent Tran
(74) *Attorney, Agent, or Firm*—Amin, Turocy, & Calvin, LLP

(57) ABSTRACT

The present invention provides a system and method that mitigates audio interference before and/or during an audio session, and in particular, when a high quality audio session is desired. The system includes an audio component that determines whether an audio session is to commence and a control component that interfaces with the audio component and reduces activity associated with a subset of a plurality of computer components that may interfere with the audio session. The system may also include at least one power management system to facilitate reducing power consumption and activity of the computer component(s). The method involves determining that an audio session is desired and switching one or more computer components to a minimal interference mode prior to commencing the audio session. The method may also involve calling at least on API to facilitate the switching of the computer component(s).

39 Claims, 9 Drawing Sheets

METHOD TO REDUCE OR ELIMINATE AUDIO INTERFERENCE FROM COMPUTER COMPONENTS

TECHNICAL FIELD

The present invention relates generally to computer noise management particularly altering operational modes of a number of computer components to facilitate mitigating undesirable interference with an application.

BACKGROUND OF THE INVENTION

The demand for superior quality and resolution of output from computing devices increases dramatically as users employ their computing devices for ever diverse purposes. For example, when microphones are integrated into part of a computing device or when microphones are placed near or in near proximity of the computing device, there is a likelihood that activity of the computing device may cause interference to or a quality reduction of an audio input. For applications which require high quality audio input or which high quality input is desired by the user, interference from the computing device may hinder obtaining the desired input fidelity.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention provides for a system and method that facilitates maximizing fidelity of a data transfer session. The invention infers, determines and/or is notified that a data transfer session (e.g., audio input, audio output, video session, wireless session, . . . ) is about to commence or has begun commencing, and initiates a minimal interference mode to mitigate interference by system components to the session. It is to be appreciated that the subject invention can employ various artificial intelligence based schemes to facilitate carrying out the subject invention. Accordingly, classifiers (e.g., trained explicitly and/or implicitly) can facilitate effecting a minimal interference mode in accordance with a user's current state as well as preference given the state. Moreover, utility-based analyses can be performed that factor in the benefits of entering a minimal interference mode versus the cost thereof and/or the cost of incorrectly entering such mode.

One particular aspect of the invention provides a system and method that allow an application (e.g., calling application) to indicate to an operating system of a computing device that high quality input, output, or an exchange of high quality sound and/or communication is about to commence, thereby facilitating the operating system to take any number of appropriate measures to ready itself for a period of quiet. For example, system or computer components such as hard disk drives and fans may cause intermittent, random bursts of, and/or ambient noise and/or vibration that can interfere with sound capture from microphones which are either internal or external with respect to the computing device. Thus, a period of minimal noise and/or vibration can be obtained via the present invention before and/or during the audio session for at least a portion of the length of the audio session. By mitigating audio interference before and/or during an audio session, high quality input can be readily obtained particularly when using portable devices such as laptops, tablet PC's and the like. Such aspect of the invention is accomplished at least in part by determining whether an audio session is desired. When an audio session is desired, an application programming interface (API) can be called—the API can correspond to instructing various components of an operating system to reach a minimal interference mode and/or period of quiet for the length of the desired audio session. The various computer components which are instructed to reach a minimal interference mode can include, but are not limited to, a floppy disk drive, a disk cache, a hard disk drive, a speaker, a fan, and a CD-ROM drive.

More specifically, one or more power management systems, and/or one or more system control functions which are associated with and control one or more computer components and/or one or more applications can be directed to bring the respective components to a minimal interference mode. In addition, one or more applications can be selectively muted before and/or during the audio session. For example, the power management system can implement at least a first reduction in overall power consumption before the audio session begins. To further mitigate audio interference during the audio session, a second reduction in power consumption and/or noise management can be made to at least one of one or more applications and one or more computer components. The amount of the power reductions may be based at least in part on historical information, current environment or state, user preferences, and/or inferences provided by an artificial intelligence component.

When the audio session has been substantially completed, the one or more power management systems can be signaled to return the respective components from the minimal interference mode back to their respective activity states (e.g., non-audio session mode). Thus, audio interference during an audio session is mitigated resulting in obtaining high quality audio.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1A:
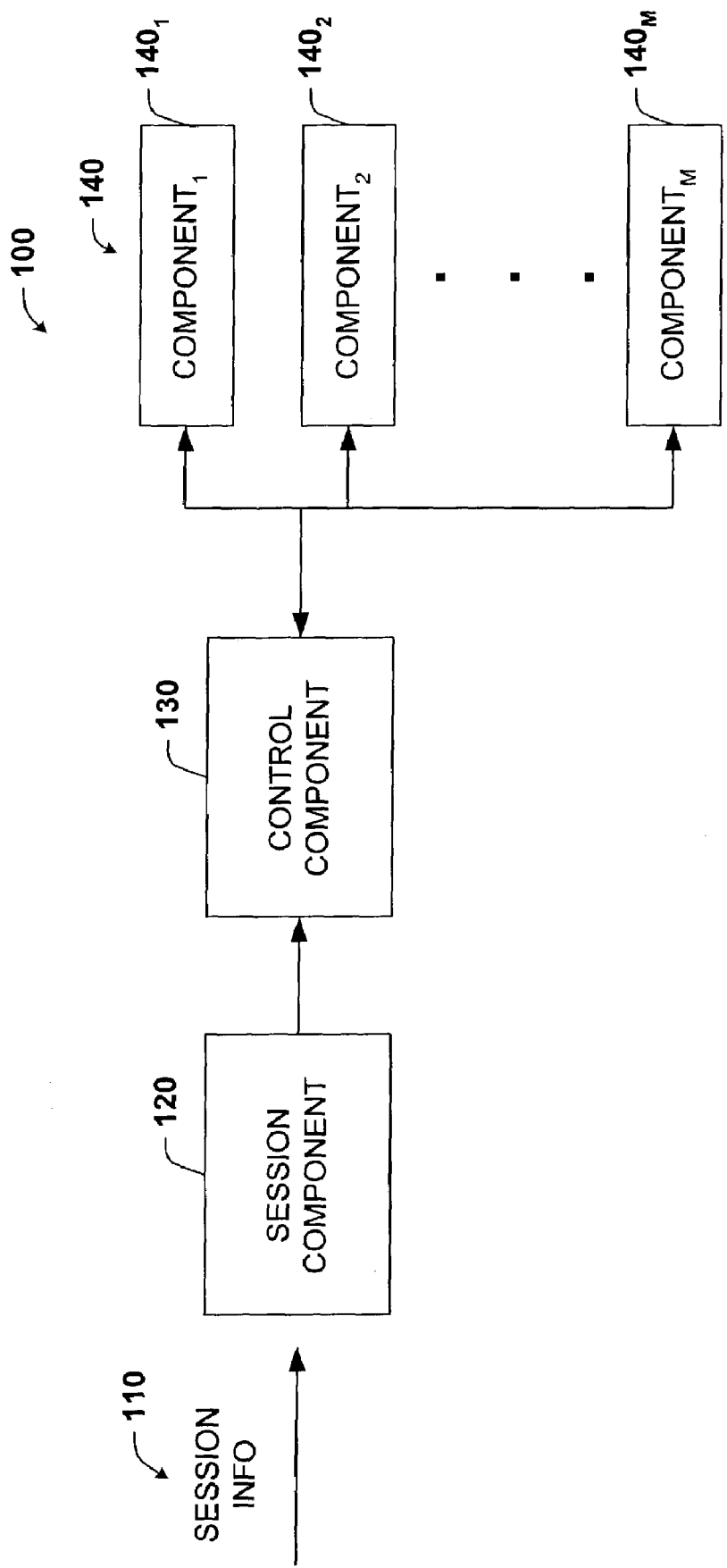
FIG. 1a is a block diagram of a system that mitigates interference during a session in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. For example, it is to be appreciated that certain aspects of the invention can employ inference engines (e.g., classifiers trained explicitly and/or implicitly) to perform a probabilistic-based or statistical-based analysis as to inferring a user's goals or intentions (as well as a component's goals or intentions) in connection with the audio interference mitigation system described herein. Thus, an audio component can infer an audio session is potentially desired by a customer based on historical, extrinsic and state information, and perform an action related to the audio session (e.g., to facilitate the occurrence thereof). Explicit training can be performed on a classifier prior to use, and implicit training can be an on-going training process performed by a user, for example.

Figure 1B:
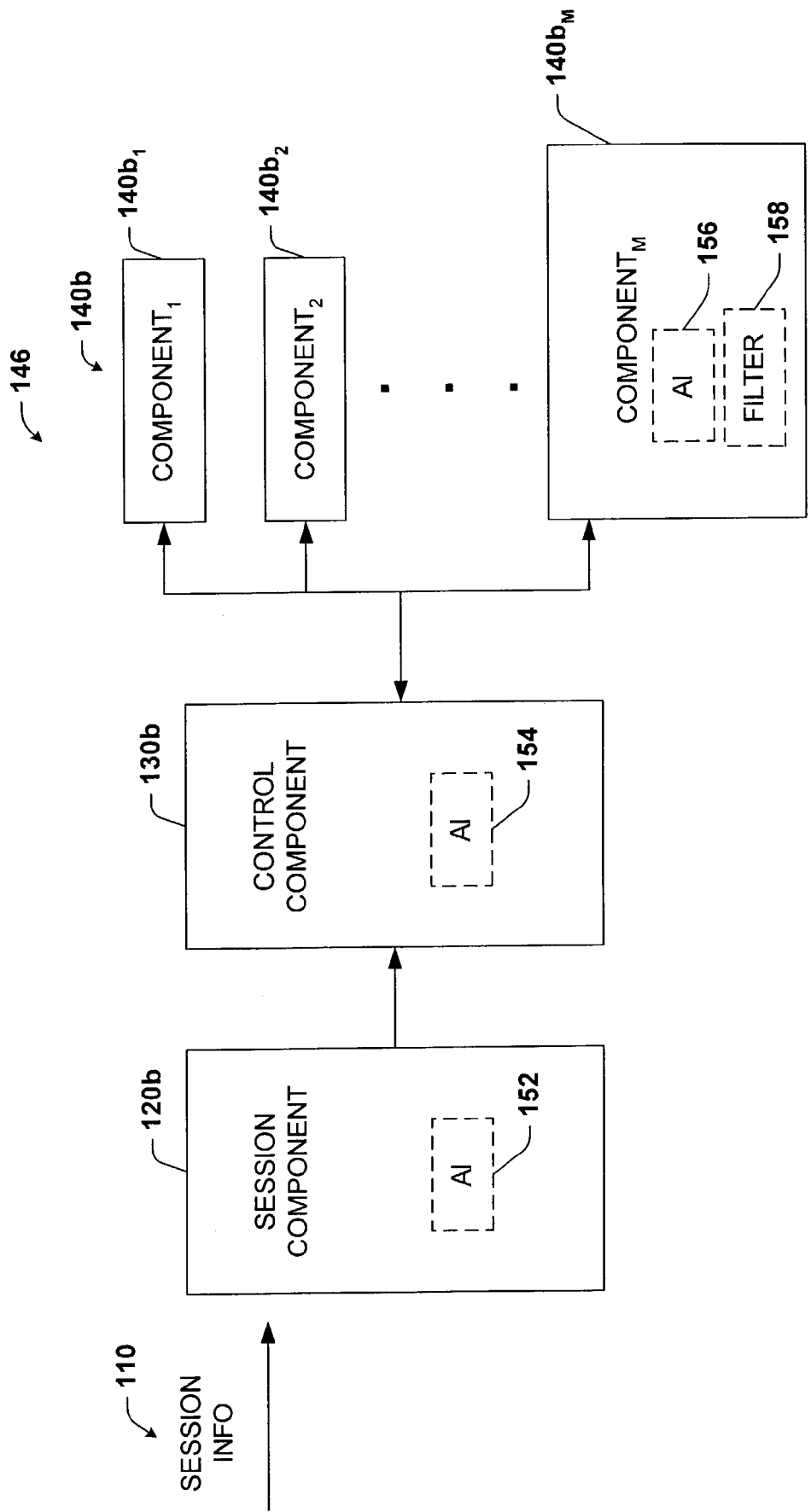
FIG. 1b is a block diagram of a system that mitigates interference during a session in accordance with an aspect of the present invention.

Referring to FIG. 1, a system 100 that mitigates interference during a high quality communication session is illustrated. The system includes session information 110 which may be received by a session component 120. The session information 110 may comprise instructions, directions, commands, and the like which may indicate to the session component whether a data session is desired. In particular, the session component 120 can determine whether a data session is desired based at least in part on the session information received either directly or indirectly (e.g., artificial intelligence) from a user and/or component. It is to be appreciated that a session is intended to include any suitable communication forum (e.g., multi-party communications, audio input, audio output, recording of information, video transmission, video recording, transmitting of information, data transfer . . . ). Moreover, the subject claimed invention is intended to address visual-based and/or stimuli-based types of communication (e.g., video, image transfer, haptics, graphics transfer, vibration, . . . ) wherein various device/system components may have a negative impact on such session.

The session component 120 communicates to a control component 130 that a session is desired. The control component 130 controls and manages at least in part any number of computer or system components 140 such as component $140_1$, $140_2$, and up to $140_M$. Thus, when a session is desired, the control component signals a subset of the computer components 140 to switch to a minimal interference mode. The control component may comprise at least one power management system and/or at least one system control function which manages at least one computer component 140 and/or at least one application related thereto.

The minimal interference mode can involve at least one of delayed interference and reduced interference such that in either case, system operations are optimized to perform near or at about the same times rather than individually at scheduled intervals over a period of time.

An exemplary implementation of the system 100 can involve a hard disk drive and a fan component. For instance, information 110 relating to the desire to commence an audio session, for example, is received by the session component 120. The control component may comprise a first power management system assigned to the hard disk drive and a second power management system assigned to the fan component. In order to switch the hard disk drive to a period of quiet or a minimal interference mode, a cache of the system 100 can be flushed or saved to the hard disk drive in order to buffer disk write(s)/read(s) and to mitigate disk access during the session. More specifically, a write cache is flushed to free storage space on the disk(s), thus permitting the maximum amount of caching to be available. Flushing the cache in accordance with the present invention allows for an optimum amount of storage caching before the disk(s) needs to be written again. Furthermore, a prefetch of the data which can be expected and/or have the potential to be needed is cached from the disk.

Thus, the cache is made available and can be populated with data from the audio session. However, when the cache is filled during the audio session (e.g., a sufficient number of disk calls have been made to fill the write cache), the hard disk drive can be accessed to flush the cache. However, its accessibility and ability to run for any other purpose can be minimized for the length of the session. Hence, the hard disk drive is maintained at the minimal interference mode as instructed.

Likewise, operation of the fan component can occur at random times as triggered by operating temperatures of the computing device. In order to switch the fan component to the minimal interference mode, the second power management system can decrease or throttle performance of the central processing unit (CPU) and/or bring into effect any suitable power reduction that effectively reduces the system heat generated. This can reduce an amount of heat generated in the CPU, which would otherwise cause the fan component to run. Moreover, the reduced activity of the hard disk drive may also contribute to the generation of less heat in the CPU. As a result, the system 100 reaches a thermal balance and the fan component can be shut down, suspended, and/or its operation delayed, interrupted, and/or minimized for the duration of the session.

Accordingly, it is to be appreciated that the subject invention contemplates a variety of types of interference (e.g., vibration, audio noise, optical noise, radiation, magnetic radiation, capacitive coupling, leakage current, flux . . . ) that may interfere with a particular type of session. The scope of the subject invention as recited in various of the hereto appended claims is intended to encompass entering components of a system in a minimal interference mode to mitigate interference (such as a subset of that noted above) to a particular session so as to improve fidelity of the session.

FIG. 1a illustrates an alternative system 146 in accordance with the subject invention. The system 146 is similar to that of the system 100 and therefore like components will have like reference numbers and redundant discussion with respect thereto is omitted for sake of brevity. The session component 120b, the control component 130b and the various system components 140b further include AI components 152, 154 and 156 respectively. The components 140b can also include filter(s) 158 which can facilitate effecting minimal interference mode in accordance with the subject invention.

The AI components 152, 154, 156 can include classifiers such as for example a Bayesian classifier, a support vector machine, and/or other type of classifier and/or other nonlinear training system(s). The AI components can facilitate performing inferences and/or utility-based determinations in accordance with the subject invention. For example, the AI component 152 can infer whether of not a session is about to commence as well perform a utility-based analysis as to whether or not to inform the control component 130 that a session is to be commenced. Various extrinsic factors (e.g., state of user, historical information, type of info. received . . . ) can be employed in connection with the inference/analysis. For example, correctly inferring that a session is about to commence can optimize effecting minimal interruption mode and mitigate loss of session fidelity at the beginning of the session. Additionally, factoring in the cost of making an incorrect inference can further facilitate utility of the invention. The AI components 152, 154 and 156 respectively can be trained explicitly as well as implicitly to facilitate optimal employment of minimal interference mode in accordance with the subject invention. It is to be appreciated that minimal interference mode is intended to encompass maximal session fidelity. Thus, various sensing modalities (e.g., microphones, data capture components, . . . ) can be heightened in order to maximize session fidelity in accordance with the subject invention. The AI components 154 and 158 of the control component 130b and the various components 140b can perform inference and utility-based determinations with respect to the functionality of their respective components.

The components 140b can also employ filter(s) 158 in connection with effecting minimal interference in accordance with the subject invention. For example, if the control component 130 determines that a particular one of the components 142 will interfere with a session but the component is critical to maintaining processing throughput for the overall system 100, a filter(s) associated with the component can be engaged to mitigate the amount of interference by the component to the session. For example, if the particular component is a power component that emits a first noise at a certain frequency that might interrupt an audio session and also emits a second noise at another frequency that might interfere with a wireless video session, the control component 130 could engage a filter designed to dampen the first noise if an audio session is about to commence or engage another filter designed to dampen the second noise type is a wireless video session is about to commence.

It is to be appreciated that the various AI components 152, 154 and 156 can work in collaboration with the session component 120, control component 130, filter(s) 158 and other components 140b in order to optimize the system 146 for maximum session fidelity.

Figure 2:
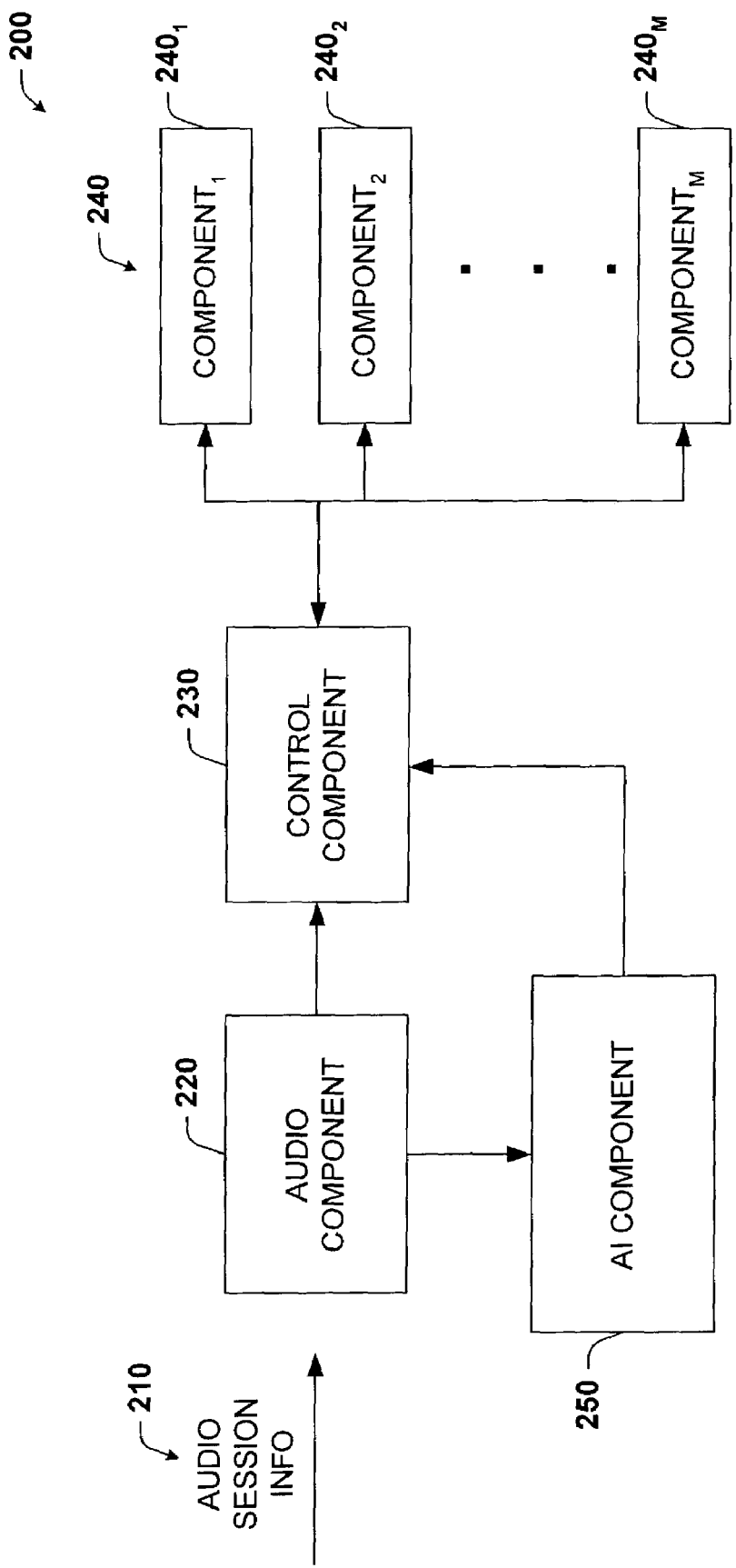
FIG. 2 is a block diagram of a system that mitigates audio interference during an audio session in accordance with another aspect of the present invention.

FIG. 2 demonstrates a system 200 that mitigates audio interference during an audio session. The system 200 includes audio session information 210 explicitly or implicitly provided by a user. Explicit information may be direct instructions from the user indicating that an audio session is desired. Implicit information can be any number of or a series of input by the user, which when analyzed, indicate that an audio session is desired.

An audio component 220 receives the audio session information 210 and determines, based at least in part on that information 210, whether an audio session is desired. The audio component 220 may also signal to an operating system (not shown) and/or to a control component 230 that an audio session is about to commence, thus certain measures should be taken in order to ready the operating system and the overall computing device (not shown) for a period of quiet for the length of the audio session. In particular, the control component 230, which is operatively linked to one or more components 240, can direct one or more of the computer components 250 to enter a period of minimal function or operation before the audio session commences.

The one or more computer components 250 selected may comprise those components which historically generate audio interference beyond a tolerable threshold with respect to high quality audio sessions. Alternatively or in addition, the one or more selected computer components 250 may contribute to CPU usage and thus heat generation, thereby causing other computer components to run in order to compensate for the heat generated within the computing device. Therefore, diminishing the amount of heat generated during the audio session reduces the running of temperature-sensitive computer components (e.g., fan) which are also likely to produce audio interference during the audio session.

Following the audio session, the control component 240 can instruct the affected computer components 250 to return to their prior states. Alternatively, some or all of the affected computer components 250 can be instructed to return to their respective default states, as desired by the user. The system 200 also includes an artificial intelligence (AI) component 250 operatively coupled to the audio component 220 and the control component 230. The AI component 250 may facilitate determining whether an audio session is desired based at least upon one or more inferences. In addition, the AI component can identify the computer components 240 which can be switched to a minimal interference mode prior to the commencement of the audio session based at least upon one or more inferences. The inferences can be based in part upon explicit training of classifier(s) (not shown) before employing the system 200 or implicit training based at least upon a user's previous actions, commands, instructions, and the like during use of the system 200. Accordingly, a utility-based analysis (e.g., via employment of a probabilistic and/or statistical based framework) can be employed that factors the costs associated with entering a minimal interference mode with the benefits thereof within a reasonable probability or confidence level. Thus, for example, the system 200 can control the components 240 based at least in part upon a determined and/or inferred state of a user(s) as well as goals of the user(s).

Turning now to FIGS. 3–7, flow diagrams of exemplary methods for carrying out various aspects of the present invention are illustrated. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 3:
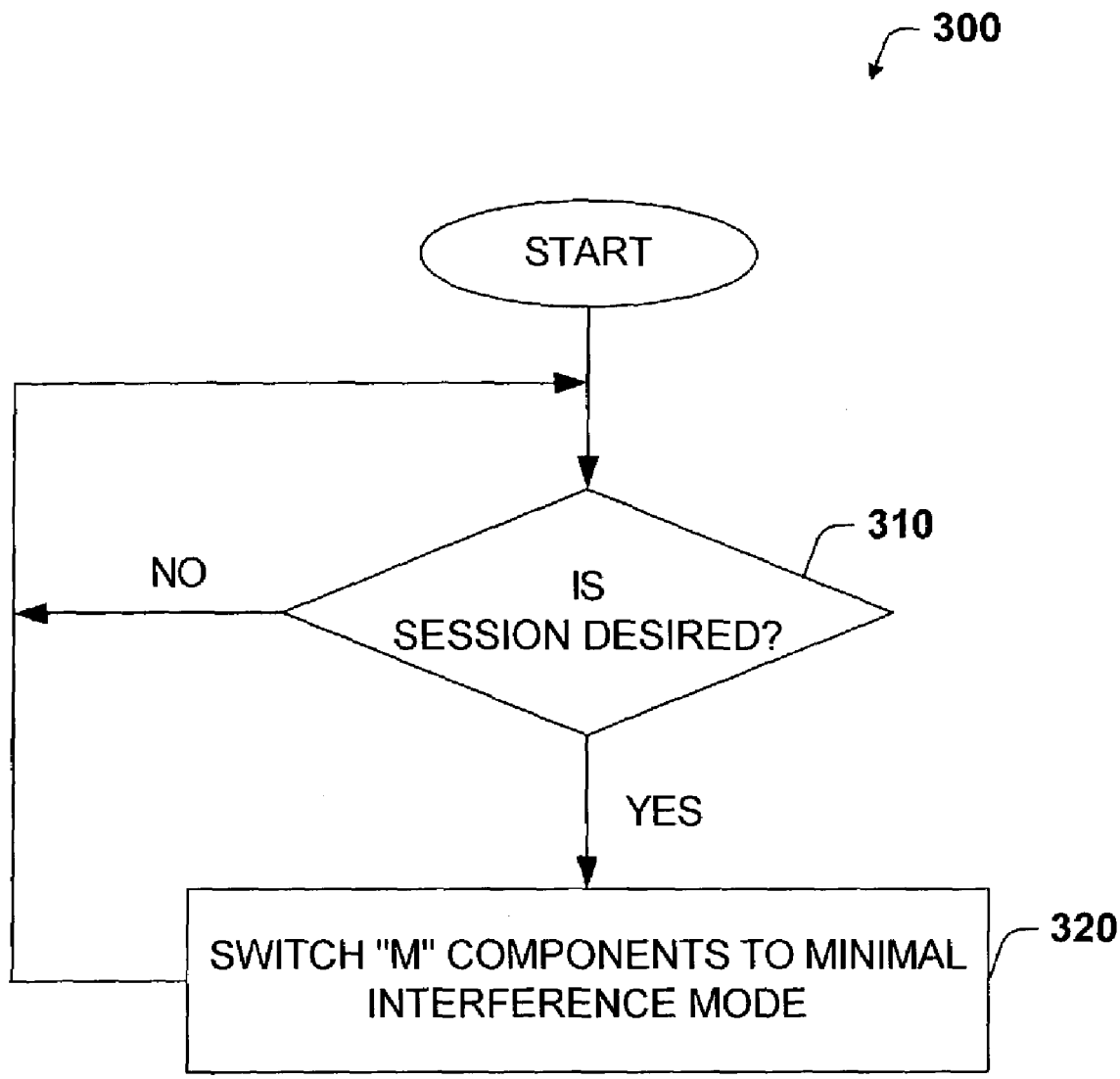
FIG. 3 is a flow diagram of an exemplary method that mitigates audio interference during an audio session in accordance with an aspect of the present invention.

In FIG. 3, an exemplary method 300 that mitigates interference during a data session in accordance with an aspect of the present invention is demonstrated. The method 300 involves determining whether a data session is desired at 310. If a session is desired, then any number of computer components of a system can be switched to a minimal interference mode. Otherwise, at 330, the state of the computing device and its operating system remain as is and/or at its current state until a session is desired.

Figure 4:
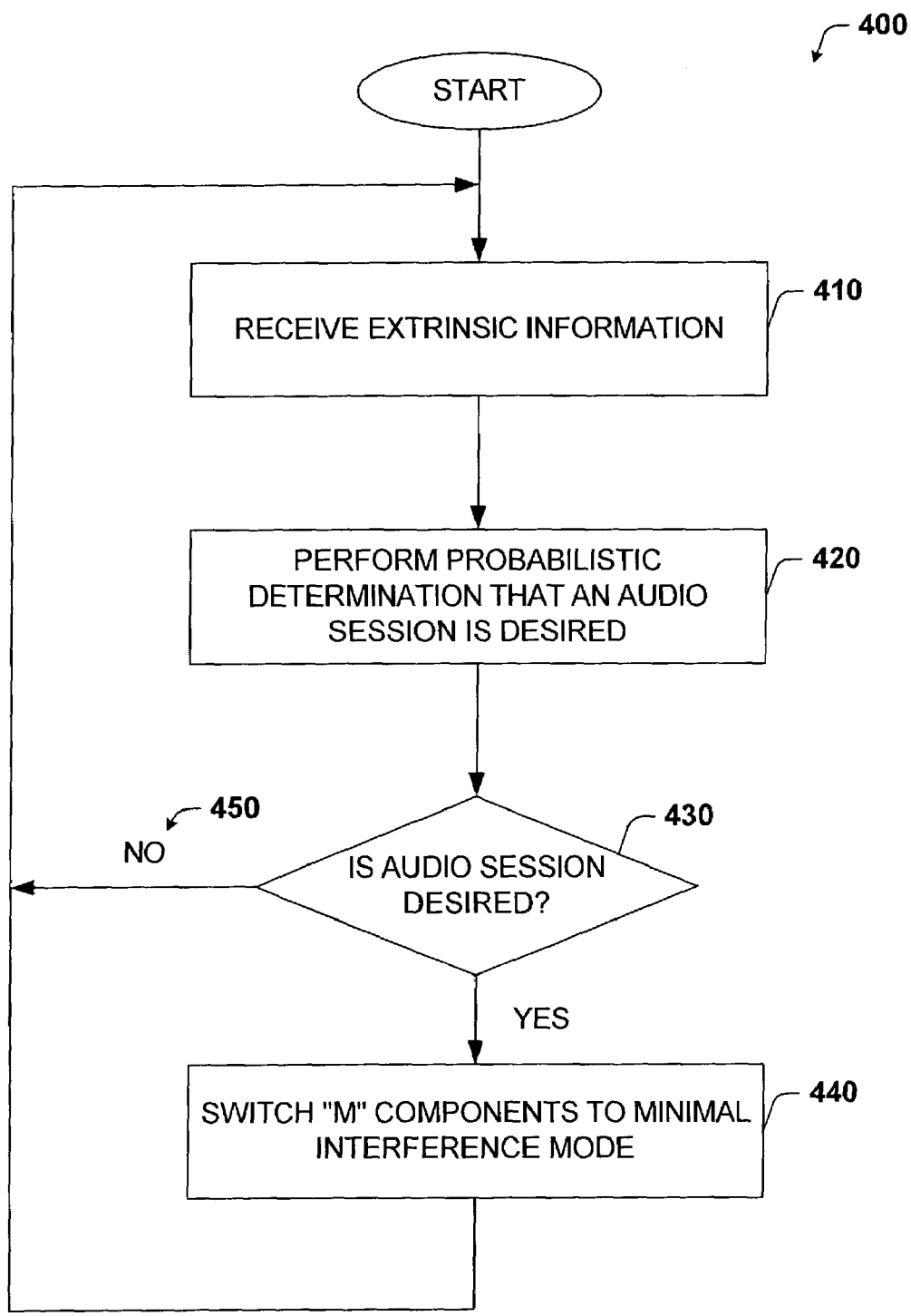
FIG. 4 is a flow diagram of an exemplary method that mitigates audio interference during an audio session in accordance with an aspect of the present invention.

FIG. 4 depicts a flow diagram of an exemplary method 400 that mitigates audio interference such as ambient noise within the computing device and any other sounds generated by the computer components during operation thereof while a high quality audio session occurs. The method 400 involves receiving extrinsic information at 410 from a calling application by way of a user. The extrinsic information may relate to an audio session. At 420, a probabilistic determination that an audio session is desired may be performed, such as by an AI component, based at least in part on the extrinsic information received. At 430, it can be determined whether an audio session is desired. Such determination may be made in part by the probabilistic determination made at 420. If an audio session is desired and/or is about to commence, one or more components may be switched to a minimal interference mode at 440 for the duration of the audio session. However, if no audio session is desired at 430 (450), the method 400 restarts and awaits to receive extrinsic information at 410.

Figure 5:
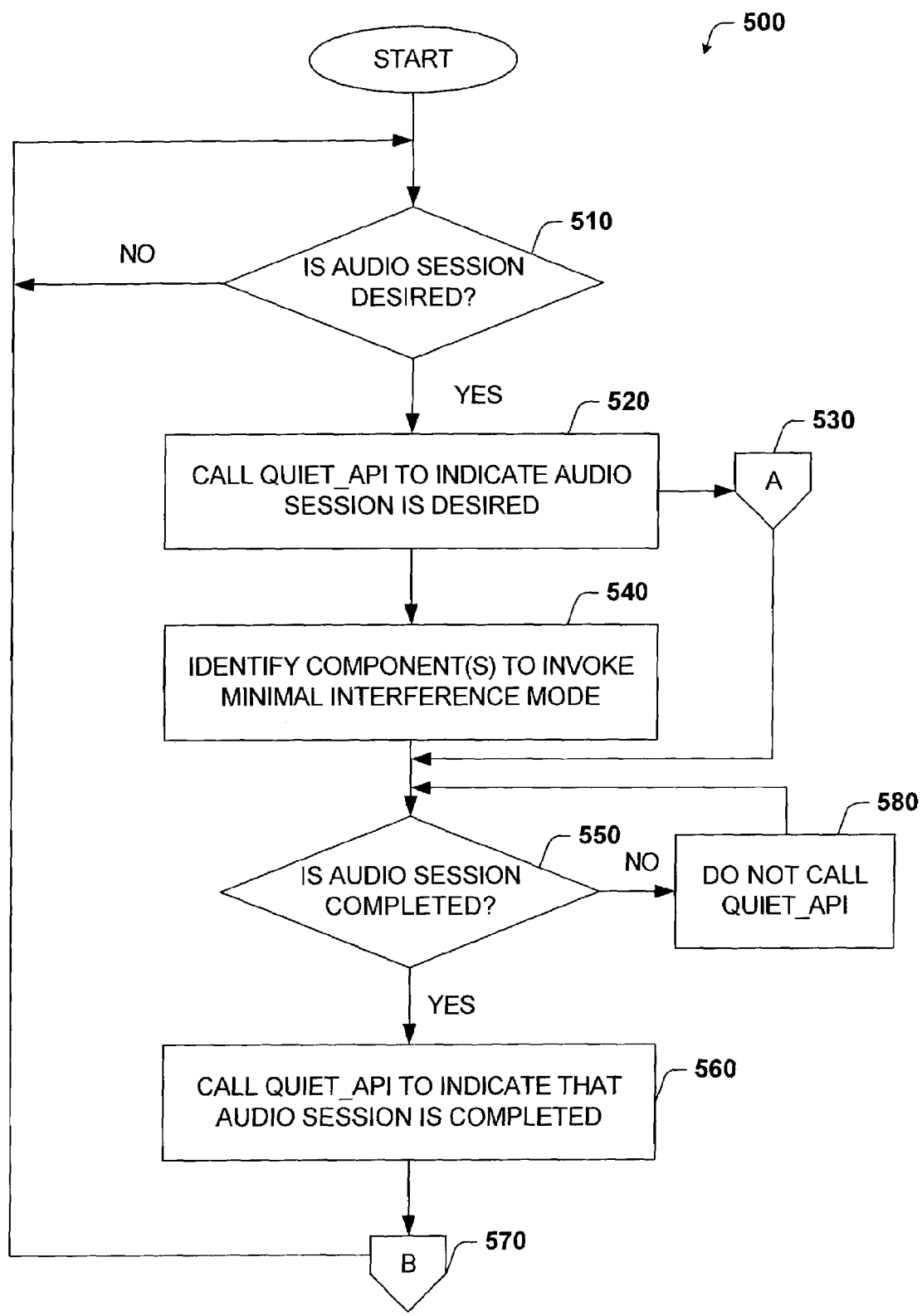
FIG. 5 is a flow diagram of an exemplary method that mitigates audio interference during an audio session in accordance with an aspect of the present invention.

FIG. 5 illustrates an exemplary method 500 that mitigates audio interference during an audio session in accordance with an aspect of the present invention. The method 500 involves determining whether an audio session is desired at 510. The method 500 remains in stead-state until an audio session is desired at 510. When an audio session is desired, an operating system calls an API such as for example a "QUIET_API" to signal that an audio session is desired and thus appropriate modifications to the operating system are to be implemented before the audio session begins. The QUIET_API at 530 involves a series of instructions as discussed below with respect to FIG. 6.

Figure 7:
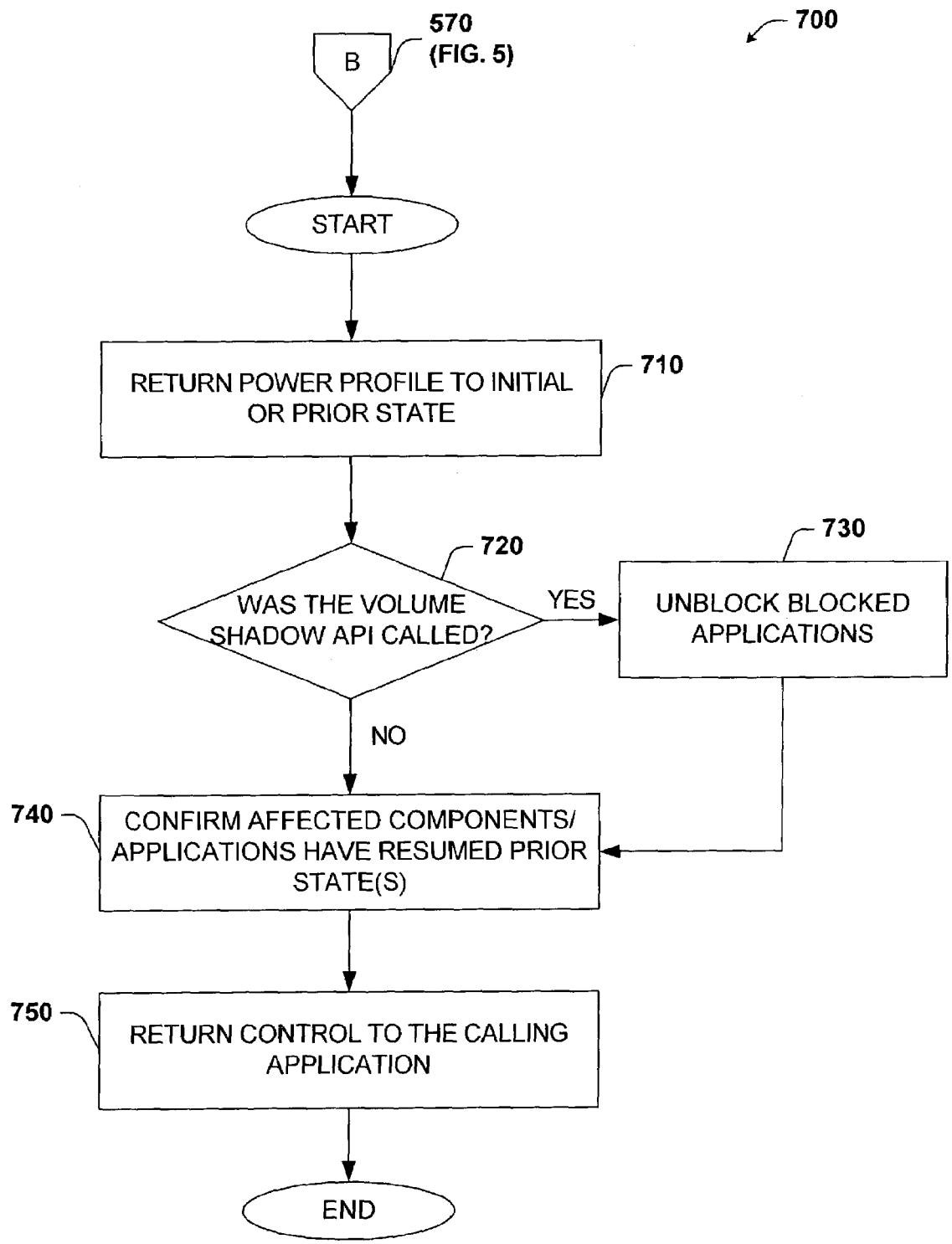
FIG. 7 is a flow diagram of an exemplary API that facilitates mitigating audio interference during an audio session in accordance with an aspect of the present invention.

When calling the API at 520, it may also be desired to identify one or more computer components which can be switched to a minimal interference mode at 540. Following the QUIET_API at 530, the method 500 determines if the audio session is completed at 550. If the audio session has been completed, then the QUIET_API is called at 560 in order to indicate that the audio session is completed and to return the affected computer components to their respective states as existed prior to the audio session. The QUIET_API at 570 involves a series or set of instructions as illustrated in FIG. 7 below which effectively facilitate resuming routine operational states to the one or more affected computer components. However, if the audio session has not been completed, then the QUIET_API is not called (570) and the system returns to 550 until a time when the session is substantially completed.

Figure 6:
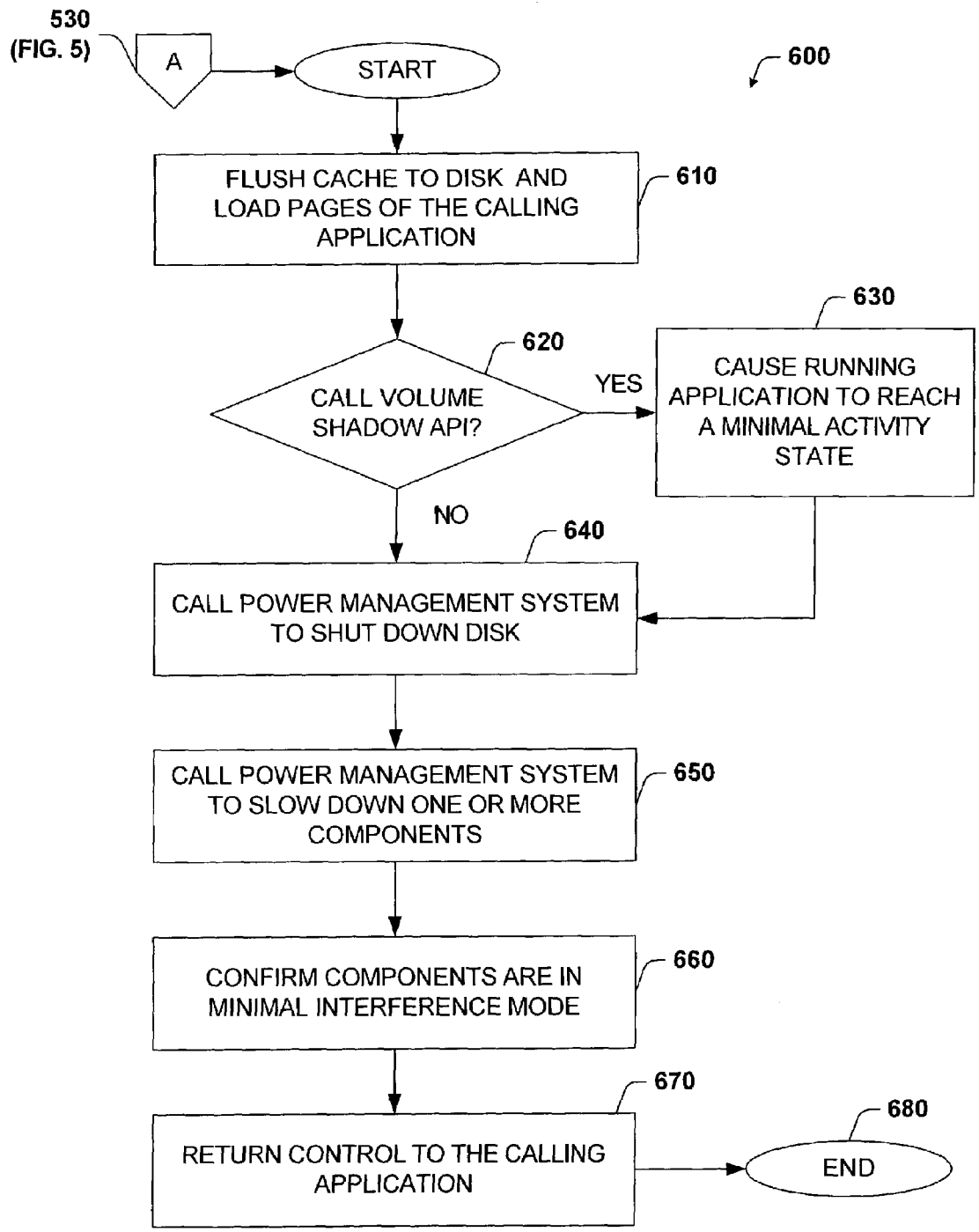
FIG. 6 is a flow diagram of an exemplary API that facilitates mitigating audio interference during an audio session in accordance with an aspect of the present invention.

FIG. 6 depicts an exemplary API 600 or QUIET_API 600 which can be employed by an operating system in order to bring itself to a period of minimal interference during a high quality sound session in accordance with an aspect of the present invention. More specifically, a calling application can invoke the QUIET_API 600 as soon as it has been determined that an audio session is desired or is about to commence. Thus, one or more running applications can be interrupted, stopped, or delayed for the length of the audio session.

The QUIET_API 600 involves flushing an operating system's write cache to disk such as a hard disk drive and loading pages relevant and applicable to the calling application to prepare for the audio session (at 610) as well as any other pages the system can anticipate for any other purpose. At 620, an optional call can be made to a volume shadow API . Calling the volume shadow API gives the appearance that the operating system is performing a backup. Thus, programs and their corresponding computer components do not run until the backup is completed. If the volume shadow API is called, any running applications are directed to reach a steady state at 630. In other words, the volume shadow API interrupts the running application. Therefore, the running application experiences a period of inactivity or delayed activity until the audio session is completed.

If calling the volume shadow API is not desired or the call has already been made, the QUIET_API 600 can continue at 640 where, for example, a power management system may be called to switch the hard disk drive to a minimal interference mode. The minimal interference mode may comprise shutting down, suspending, slowing down, interrupting, or delaying operation of the hard disk drive for the length of the audio session or as otherwise determined by the user and/or the calling application. At 650, a power management system may be called to temporarily shut down, slow down, interrupt, suspend, or delay operations of one or more other computer components which collectively contribute to producing ambient noise or other random bursts of noise. Hence, the states of such computer components should reflect a minimal interference mode as well.

In addition, the power management system may initiate at least a first reduction in power consumption to minimize the amount of interference before the audio session begins and a second reduction in power consumption during the audio session. For example, before and/or during the audio session, the power management system may selectively mute applications which tend to produce system event time noises.

At 660, the QUIET_API 600 can optionally confirm whether the desired computer components have been switched to the minimal interference mode. At 670, the QUIET_API 600 can return control of the operating system and/or the computing device as a whole to the calling application so that the audio session may be performed. The QUIET_API 600 ends at 680. It should be appreciated that the QUIET_API 600 can involve additional instructions related to mitigating audio interference during the high quality audio session.

When the audio session has been completed, an exemplary API such as a QUIET_API 700 can be called by the calling application (570 in FIG. 5) in order to remove any affected computer components and/or applications from the minimal interference mode. The QUIET_API 700 involves returning any affected power profile to its state which existed prior to the commencement of the audio session (at 710). That is, the one or more computer components switched to a minimal interference mode to prepare for the audio session may resume their respective routine or prior power profile. In addition, any applications which have been previously muted or otherwise interrupted may also resume operation.

For example, if the volume shadow API was called (720), blocked applications can be unblocked at 730. Optionally, the QUIET_API 700 may confirm that the affected computer components and/or applications have returned to their respective states existing prior to the audio session (e.g., state when in non-audio session mode). At 750, control of the operating system and/or the computing device may be returned to the calling application.

Figure 8:
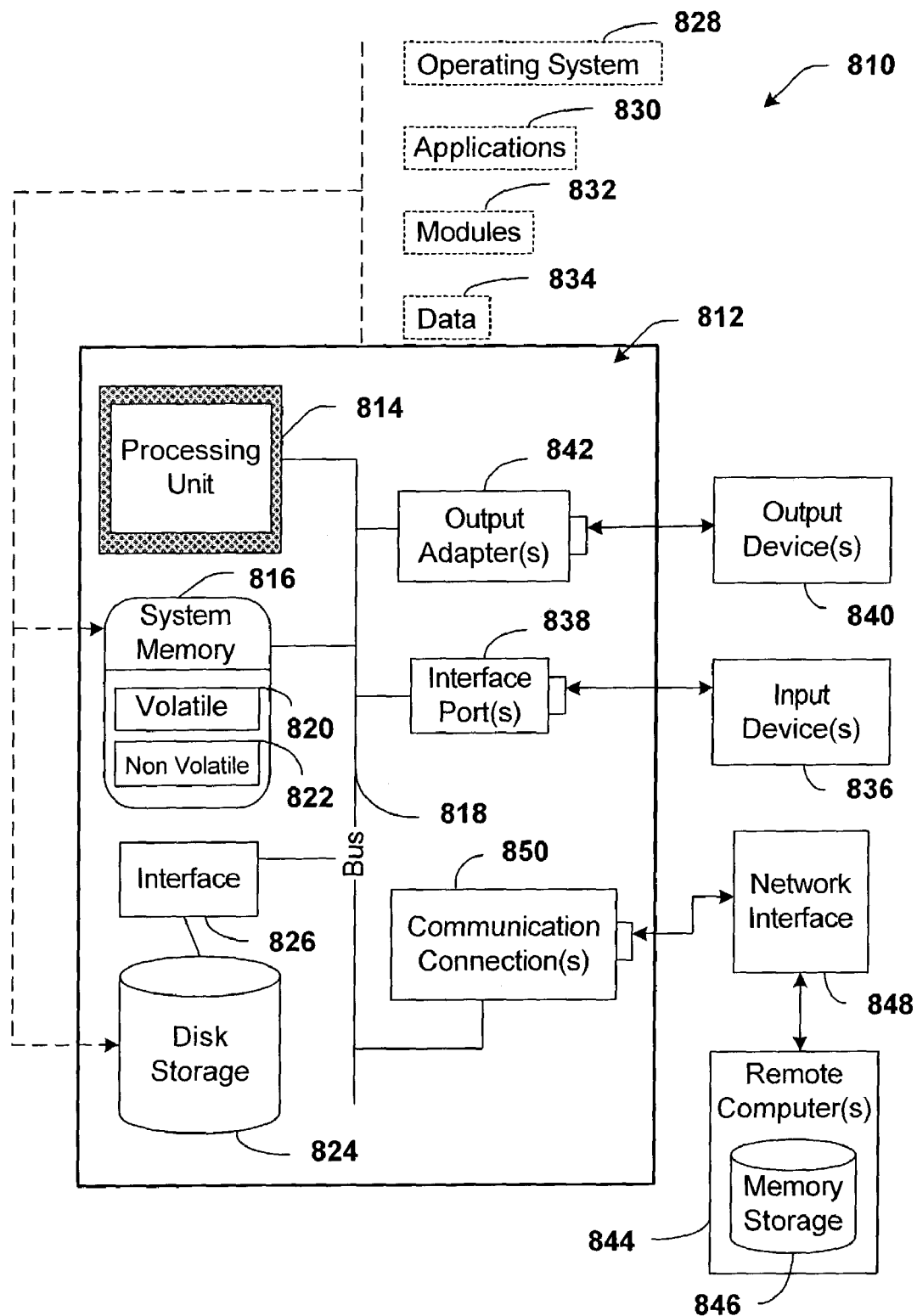
FIG. 8 illustrates an exemplary environment for implementing various aspects of the invention.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates fidelity of a data transfer session in a system that comprises a plurality of components, comprising:
    a session component that infers and/or determines that the data transfer session is about to commence; and
    a control component that initiates a minimal interference mode in connection with a subset of the components in response to learning that the data transfer session is about to commence, wherein the control component performs a utility-based analysis that factors benefits associated with entering the minimal interference mode with cost of entering the mode, and further factors costs of incorrectly entering the mode.

2. The system of claim 1, the data transfer session comprising an audio session.

3. The system of claim 1, the data transfer session comprising a video session.

4. The system of claim 1, the data transfer session comprising wireless transfer of data.

5. The system of claim 1, the data transfer session comprising optical transfer of data.

6. The system of claim 1, further comprising a classifier that facilitates inferring when the session is to commence.

7. The system of claim 1, the subset of the components comprising filter(s) that are employed to facilitate mitigating interference by the respective components to the session.

8. A computer readable medium comprising the session component and control component of claim 1.

9. An audio recording system comprising the system of claim 1.

10. A video recording system comprising the system of claim 1.

11. A communication system comprising the system of claim 1.

12. A system for mitigating audio interference during high quality sound input comprising:
    an audio component that determines whether an audio session is to commence; and
    a control component that interfaces with the audio component and reduces activity associated with a subset of a plurality of computer components that may interfere with the audio session, wherein the control components initiates a minimal interference mode in connection with the subset of the cmoponents and performs a utility-based analysis that factors benefits associated with entering the minimal interference mode with cost of entering the mode, and further factors costs of incorrectly enterin the mode.

13. The system of claim 12, the plurality of computer components comprising a disk cache, a hard disk drive, a fan, a CD-ROM drive, and a floppy disk drive.

14. The system of claim 12, comprising an artificial intelligence component that interfaces with the audio component and the control component to cause any number of computer components to switch to a minimal interference mode based at least upon one or more inferences.

15. The system of claim 12, wherein an audio session comprises at least one of a sound recording, a voice recording, any audio input, any audio output, any sound input, any sound output, and any exchange of at least one of sound and audio between at least a computer component and any number of external components.

16. The system of claim 12, wherein the control component comprises at least one power management system that manages power consumption, a power supply, and a corresponding level of activity associated with at least one of one or more computer components and one or more applications.

17. A method for mitigating audio interference during high quality sound input comprising:
    determining that an audio session is desired;
    switching at least one or more computer components to a minimal interference mode at at least prior to commencing the audio session;

performing a utility-based analysis that factors benefits associated with entering the minimal interference mode with cost of entering the mode; and performing a utility-based analysis that factors benefits associated with entering the minimal interference mode with costs of incorrectly entering the mode.

18. The method of claim 17, further comprising signaling one or more system components to resume activity when the audio session substantially completed.

19. The method of claim 17, further comprising returning the one or more system components from minimal interference mode to one or more respective prior states.

20. The method of claim 17, further comprising calling at least one application programming interface (API) to switch one or more system components to a minimal interference mode.

21. The method of claim 17, further comprising identifying at least one of one or more components and one or more applications to switch to a minimal interference mode.

22. The method of claim 17, further comprising switching at least one or more computer components to a minimal interference mode during the audio session.

23. A method of mitigating audio interference during high quality sound input comprising:

providing a calling application;

determining whether an audio session is desired based at least in part on the calling application;

calling at least one API when an audio session is desired to cause at least one or more computer components having one or more first activity states to reach one or more second activity states, the second activity states being lower than the first activity states;

returning control to the calling application in order to carry out the audio session;

performing a utility-based analysis that factors benefits associated with entering the one or more first and second activity states with cost of entering the activity states; and performing a utility-based analysis that factors benefits associated with entering the one or more first and second activity states with costs of incorrectly entering the activity states.

24. The method of claim 23, further comprising identifying at least one or more system components to switch to the one or more second activity states.

25. The method of claim 23, wherein calling at least one API comprises temporarily shifting control from the calling application to the at least one API.

26. The method of claim 23, wherein the one or more computer components correspond to at least one running application.

27. The method of claim 23, wherein the one or more first activity states comprise one or more power profiles corresponding to at least the respective computer components operating in a non-audio session mode.

28. The method of claim 23, wherein the one or more second activity states correspond to a minimal interference mode for at least the respective computer components.

29. The method of claim 23, further comprising determining whether the audio session is completed.

30. The method of claim 23, further comprising calling the at least one API to return at least the one or more computer components to the respective first activity states.

31. An API that switches one or more system component profiles to a minimal interference mode when a high quality audio session is desired comprising:

flushing a write cache to a disk drive;

reading data from the disk drive into the cache;

calling at least a first power management system to minimize at least one of running and accessing the disk drive;

calling a second power management system to toggle one or more computer component activity profiles to a minimal interference mode; and calling a volume shadow API to cause a running application to reach a minimal state such that audio interference is mitigated during the audio session.

32. The API of claim 31, further comprising receiving a signal from a calling application that an audio session is desired.

33. The API of claim 31, further comprising selectively muting one or more applications before and during the audio session.

34. The API of claim 31, further comprising: performing a first reduction in power consumption before the audio session begins; and performing a second reduction in power consumption during the audio session.

35. The API of claim 31, further comprising confirming that one or more computer components are currently in the minimal interference mode.

36. The API of claim 31, further comprising returning control to the calling application in order for the calling application to perform the audio session.

37. The API of claim 31, wherein the data read from the disk drive into the cache facilitates switching to the minimal interference mode.

38. A computer readable medium having a computer usable component for an audio interference mitigation system, comprising:

an audio component that determines whether an audio session is to commence; and a control component that interfaces with the audio component and reduces at least one of power consumption and activity associated with a subset of a plurality of computer components that may interfere with the audio session, wherein the control component initiates a minimal interference mode in connection with the subset of the components and performs a utility-based analysis that factors benefits associated with entering the minimal interference mode with cost of entering the mode, and furhter factors costs of incorrectly entering the mode.

39. A system for mitigating interference during a data transfer session, comprising:

means for determining that the session is desired; and means for switching one or more computer components to a minimal interference mode prior to commencing the session;

means for performing a utility-based analysis that factors benefits associated with entering the minimal interference mode with cost of entering the mode; and means for performing a utility-based analysis that factors benefits associated with entering the minimal interference mode with costs of incorrectly entering the mode.

* * * * *